United States Patent [19]
Wisler et al.

[11] Patent Number: 5,202,145
[45] Date of Patent: Apr. 13, 1993

[54] METHOD OF MAKING A SHELF-STABLE MILK-CONTAINING BEVERAGE PRODUCT

[75] Inventors: John R. Wisler, New Hope, Pa.; Pilar Cobos, Hackensack, N.J.; Raymond J. Laudano, New Fairfield, Conn.

[73] Assignee: Kraft General Foods, Inc., Northfield, Ill.

[21] Appl. No.: 710,614

[22] Filed: Jun. 5, 1991

[51] Int. Cl.$^5$ ............................................. A23C 9/156
[52] U.S. Cl. .................................. 426/580; 426/561; 426/569; 426/584; 426/590; 426/594; 426/597; 426/654
[58] Field of Search ............... 426/580, 591, 590, 594, 426/597, 654, 650, 561, 569, 584

[56] References Cited

U.S. PATENT DOCUMENTS

| | | | |
|---|---|---|---|
| 3,843,828 | 10/1974 | Arndt | 426/519 |
| 4,081,567 | 3/1978 | Haber | 426/580 |
| 4,343,819 | 8/1982 | Wood et al. | 426/591 |
| 4,980,182 | 12/1990 | Kwon et al. | 426/580 |

Primary Examiner—Jeanette Hunter
Assistant Examiner—Helen Pratt
Attorney, Agent, or Firm—Thomas A. Marcoux; Linn I. Grim; Thomas R. Savoie

[57] ABSTRACT

An aqueous shelf-stable beverage product comprises: water; milk solids; an acidic flavoring agent; a two component stabilizing system comprising a first component comprising monoglycerides and up to 10% by weight diglycerides, and a second component comprising carrageenin or pectin; disodium phosphate; and potassium hydroxide; the shelf-stable beverage product having a pH of about 6.3 to about 6.5. A method for making a shelf-stable beverage product comprises: providing a homogenized milk mixture having the two component stabilizer system; providing a buffered aqueous flavoring solution containing the acidic flavoring agent, disodium phosphate, and potassium bicarbonate; mixing the homogenized milk mixture and the aqueous flavoring solution to form a mixture having a pH of from 6.8 to 7.2; and heating to decompose the potassium bicarbonate to potassium hydroxide and carbon dioxide such that the pH is from 6.3 to 6.5.

14 Claims, No Drawings

METHOD OF MAKING A SHELF-STABLE MILK-CONTAINING BEVERAGE PRODUCT

BACKGROUND OF THE INVENTION

The present invention relates to shelf-stable milk-containing beverage products and to methods of producing the same.

In producing milk-containing products that include a flavoring that is acidic in nature, it has been difficult to provide a shelf-stable product which is comparable to a freshly made beverage. Such products include coffee-flavored milk beverages and orange julius which contain the acidic flavorings coffee and orange juice. While beverage powders and dried milk can be used to prevent degradation during storage, reconstituting the beverage from powders by dilution with water has not provided entirely satisfactory results.

It is reported in U.S. Pat. No. 4,980,182 that it has not been possible to produce acceptable ready-to-serve cafe au lait products involving high temperature processing followed by aseptic processing because of the development of both physical and flavor defects. That patent relates to such products in which the physical and flavor defects are improved by utilizing a buffering agent capable of buffering the coffee acids to a pH of 6.6-6.8, kappa carrageenin in an amount of up to 0.01%, and a chelating agent containing at least 0.005% sodium alginate and/or propylene glycol alginate, the amounts being by weight based on the beverage weight.

SUMMARY OF THE INVENTION

It is an object of the present invention to provide an aqueous acidic flavored milk-containing product that is shelf-stable. The product can be in either a liquid concentrate or ready-to-drink form.

It is another object of the invention to provide a method for producing such a milk-containing product.

The present invention provides an aqueous shelf-stable beverage product comprising: water; milk solids, the milk fat content of which is at least about 15% by weight and the milk protein content of which is at least about 25% by weight base on the total weight of milk solids, the milk solids content of the beverage product being at least about 1% by weight of the beverage product; an acidic flavoring agent; a two component stabilizing system comprising a first component comprising one or more monoglycerides and up to 10% by weight of diglycerides based on the weight of the first component and a second component comprising carrageenin or pectin or both; a buffering system comprising disodium phosphate and potassium hydroxide, said potassium hydroxide being formed by the thermal decomposition in the beverage product of potassium bicarbonate, said disodium phosphate and potassium hydroxide being present in an amount such that said shelf-stable beverage product has a pH of about 6.3 to about 6.5.

The present invention also provides a method for making a self-stable beverage product comprising the steps of: providing a homogenized milk mixture comprising water, milk solids and a two component stabilizer system comprising a first component comprising one or more monoglycerides and up to 10% by weight diglycerides based on the weight of the first component and a second component comprising carrageenin or pectin or both; providing a buffered aqueous flavoring solution containing an acidic flavoring agent and buffering system comprising disodium phosphate and potassium bicarbonate in amounts such that the pH of the aqueous flavoring solution is from 6.8 to 7.2; mixing said homogenized milk mixture and said aqueous flavoring solution to form an intermediate liquid mixture having a pH of from 6.8 to 7.2; and heating said intermediate liquid mixture at a temperature and for a time sufficient to thermally decompose substantially all of said potassium bicarbonate to potassium hydroxide and carbon dioxide such that the pH of the intermediate mixture is from 6.3 to 6.5 and sufficient to form a shelf stable beverage product, said shelf stable beverage product containing at least 1% by weight of milk solids, the milk fat content of said milk solids being at least about 15% by weight and the milk protein content of said milk solids being at least about 25% by weight based on the total weight of milk solids.

DETAILED DESCRIPTION OF THE INVENTION

The milk solids used in the product and process of the invention may be provided by all forms of milk including whole milk, condensed milk and dried milk powder. In the description of the invention, the term "milk" will be used to describe an aqueous dispersion of milk solids, such as whole milk or dry or condensed milk diluted with water. The amount of milk solids in the final beverage product may vary widely but will suitably be from 1 to 5% by weight for a ready-to-drink beverage and from 2.5 to 25% by weight for a beverage concentrate, based on the weight of the beverage product. In cow's milk the total solids content of milk is generally about 11-15%. Of the total milk solids, at least about 15% of the solids is milk fat and at least about 25% is protein. Total milk fat content is typically from 15 or 20 to 33% and total protein content is typically 25 to 35%, based on the weight of the total milk solids.

Milk is mixed with a two component stabilizer system and homogenized to form a stabilized homogenized milk mixture. The stabilizer system stabilizes the emulsion in the beverage product produced from the milk. One component of the stabilizer system is one or more monoglycerides which may contain up to about 10% by weight of one or more diglycerides. The monoglyceride component is preferably vegetable-derived and is preferably utilized in an amount of about 0.05 to 0.25% by weight based on the weight of a ready-to-drink beverage about 0.125 to 1.25% by weight in a beverage concentrate, and about 3 to 18%, preferably about 6 to 12%, by weight based on the weight of the milk fat. The monoglyceride component will normally, but not necessarily, have a diglyceride content of up to 10% by weight based on the total weight of this component.

A monoglyceride is a mono-ester of glycerol and a fatty acid, a diglyceride being a di-ester formed by esterification of glycerol with two fatty acid molecules. Preferred monoglycerides and diglycerides are those in which the fatty acids have from 10 to 22 carbon atoms, preferably from 14 to 20 carbon atoms. The monoglyceride component can be a monoglyceride of a single fatty acid but will normally and preferably be monoglycerides of several different fatty acids. The monoglyceride component will normally contain up to 10% of one or more diglycerides which are often present in commercially available monoglycerides In that event, any diglycerides are present in an amount of not more than 10% by weight based on the weight of the mono- and diglycerides.

The second component is carrageenin or pectin or a mixture of the two. This component is preferably utilized in an amount of from 0.005 to 0.25% by weight based on the weight of a ready-to-drink product about 0.0125 to 1.25% by weight based on the weight of a beverage concentrate, and about 0.5 to 10%, preferably about 1–5%, based on the weight of the milk fat. At the higher end of this range, above about 0.05% in a ready-to-drink beverage, this component will contribute an increased thickening of the product, creating a more creamy consistency. When the two components are used in admixture, the amount of each is preferably at least 10% by weight of the mixture, and more preferably the carrageenin component is at least 35% by weight of the mixture. The carrageenin is preferably a mixture of kappa- and iota-carrageenin in which case the kappa-carrageenin content is preferably at least 40% by weight, more preferably 50–90% by weight, based on the weight of the carrageenin mixture.

The milk is generally maintained at an elevated temperature during mixing with the stabilizers in order to facilitate dissolution of the stabilizers in the milk mixture. Typically, the milk mixture is maintained at a temperature of about 150° to 175° F.

After mixing the stabilizer system with the milk, the stabilized milk mixture is homogenized in order to form a homogenized milk mixture. It is preferred that homogenization be effected to produce a narrow size range of fat particles with at least 75%, preferably at least 80%, and more preferably at least 85% by weight of the suspended milk fat particles being within a size range of 0.5–2 microns. Various processes of and equipment for homogenizing milk can be used in the method of the invention and these process are well known in the art. A conventional two stage homogenizer is suitable.

The acidic flavoring agent of the invention can be any such flavoring such as coffee, tea, orange juice, rum, amaretto, etc. that is used in a milk-containing beverage The term "acidic flavoring agent" as used herein means an edible flavoring agent which produces a pH of 5.5 or less when added to water. A preferred flavoring agent is coffee in the form of an aqueous coffee extract that can be used to make a shelf-stable coffee flavored beverage While the description that follows focuses on the use of coffee extract in the beverage product of the invention, it should be understood that other acidic flavoring agents can be used.

The flavoring agent, for example coffee extract, is combined with a particular buffering system and with added water as appropriate to form an aqueous flavoring solution having a pH of about 6.8 to 7.2, more preferably 6.9 to 7.1, and most preferably about 7.0.

The buffering mixture includes disodium phosphate and potassium bicarbonate. The buffering mixture raises the pH of the aqueous flavoring solution and, thereby, prevents the acidic flavoring agent from curdling the milk when the milk is mixed with the aqueous flavoring solution to form an intermediate liquid mixture. Further, when the potassium bicarbonate thermally decomposes during subsequent retorting, the pH of the intermediate liquid mixture adjusts to a pH of about 6.3 to 6.5 which imparts desirable organoleptic properties to the beverage product of the invention.

The buffering components are utilized in an amount sufficient to adjust the aqueous acidic flavoring solution and the intermediate mixture to a pH of from 6 8 to 7.2, the relative amounts of its two components being such that when the potassium bicarbonate buffering component is decomposed during heat treatment of the intermediate mixture, the pH of the heat treated product is lowered to a value within the range of 6.3 to 6.5. In the case of a ready-to-drink coffee-based beverage product the disodium phosphate buffering component is typically used in an amount of 0.1 to 0.7%, for example 0.1 to 0.2% by weight based on the weight of the acidic aqueous coffee flavoring solution or about 0.03 to 0.2%, for example about 0.03 to 0.05% by weight based on the weight of the ready-to-drink coffee-based beverage product, and the potassium bicarbonate buffering component is typically used in an amount of 0.3 to 0.5%, for example about 0.35 to 0.4% by weight based on the weight of the aqueous acidic coffee flavoring solution.

The aqueous flavoring solution is mixed with the homogenized milk mixture in a finishing tank to form an intermediate liquid mixture having a pH of from about 6.8 to 7.2. In this tank, additional flavorings and/or sweeteners including both natural (e.g. sugar) and/or artificial sweeteners may be added to the intermediate liquid mixture. Flavorings and/or sweeteners can also be added to the aqueous acidic flavoring solution and/or to the milk solution prior to mixing with the milk. Suitable additional flavorings include cinnamon, honey, etc. The finishing tank is preferably maintained at a temperature of about 80° to 105° F., in order to facilitate subsequent retorting but without causing undue volatilization of flavor components.

In a preferred embodiment, after mixing the homogenized milk mixture and the aqueous flavoring solution, the intermediate liquid mixture is hermetically bottled or canned and retorted to sterilize the milk product and to thermally decompose substantially all of the potassium bicarbonate to form potassium hydroxide and carbon dioxide, thereby lowering the pH in the beverage product so produced to about 6.3 to 6.5. Suitably the intermediate liquid mixture is retorted at a temperature of about 240° to 252° F. for 5 to 35 minutes, preferably at about 246° F. for 14 minutes, to sterilize the beverage product and thermally decompose the potassium bicarbonate. The beverage at this pH range provides desirable organoleptic characteristics. At a pH below 6.1, the milk will tend to curdle, while at a pH greater than about 7, saponification will occur. Instead of retorting the mixture after bottling, the mixture can be aseptically processed and packaged in any approved conventional manner.

The carbon dioxide formed during the thermal decomposition of the potassium bicarbonate functions to lower the pH and to reduce the amount of oxygen in the headspace. A portion of the carbon dioxide will dissolve in the beverage product, but the amount is not sufficient to provide a carbonated beverage, while the major portion of the carbon dioxide is present in the headspace of the container.

The retorting of the mixture has the effect of rendering the beverage product free of viable forms of microorganisms having public health significance. If thermophiles survive the retorting process and are suspected of being present in the beverage, a small amount of a preservative such as ascorbyl palmitate can be added. An amount of about 0.02 to 0.1%, preferably about 0 02 to 0.06% by weight of ascorbyl palmitate based on the weight of the beverage is suitable.

The beverage product is shelf-stable. That is, the quality of the beverage product is stable for a period of at least nine months at a temperature of between about 35 and about 90° F.

In a preferred embodiment, the beverage product of the invention is in a ready-to-drink form. In its ready to drink form, the beverage product of the invention preferably has a total solids content of about 8-18% by weight and a total milk solids content of at least about 1% by weight based on the weight of the beverage.

By controlling the water content in the beverage product, a liquid beverage concentrate can also be produced. In its liquid concentrate form, the beverage product of the invention preferably has a solids content of about 25-65% by weight.

EXAMPLE

A mocha flavored iced cappuccino beverage is prepared. An aqueous acidic flavoring solution is made up in a vessel by adding to the vessel, with stirring:

|  | Parts by weight |
|---|---|
| Water | 834 |
| Soluble Coffee Powder | 52 |
| Potassium bicarbonate | 3.5 |
| Disodium phosphate | 1.6 |

The pH is then measured. The pH of the dissolved soluble coffee is about 5 and the pH of the solution will normally be within the target range of 6.8 to 7.2. If the pH is below 6.8, additional disodium phosphate is added. For example, if the pH measures from 6.75 to 6.8, the addition of about ¼ part by weight of disodium phosphate will suffice to bring the solution pH to a value within the target range. In this example, the pH is 6.9.

The following aqueous sweetener solution is then added to the vessel, with stirring:

|  | Parts by weight |
|---|---|
| Water | 1670 |
| Granulated sugar | 375 |

The water employed throughout the example is city water that has been purified by filtration and has a substantially neutral pH.

A coloring/flavoring solution, made up as follows, is also added to the vessel, while stirring:

|  | Parts by weight |
|---|---|
| Water | 425 |
| Mocha flavor | 25 |
| Caramel Color | 0.8 |

A homogenized milk solution is made up separately by combining the following ingredients, followed by homogenizing:

|  | Parts by weight |
|---|---|
| Water | 835 |
| Dry whole milk | 130 |
| Carrageenin ("Sea Kem GP-418, Marine Colloids) | 0.65 |
| Monoglyceride Component ("Myverol 18-07K", Eastman Chemicals Co.) | 3.9 |

The dry whole milk is first mixed with the water and the milk is maintained at a temperature of about 160° F. to facilitate dissolution of the gum and emulsifier which are premixed with about 5-10 parts by weight of the milk solution before being blended with the entire milk solution. The milk solution is then homogenized in a two stage homogenizer. Pressure in the final stage is about 5000 psi in the first stage and about 500 psi in the second stage, and the temperature is about 170°-175° F.

The milk solution is then introduced into the vessel with stirring. The pH of the resulting beverage mixture is 6.9, well within the target range of 6.8 to 7.2 and contained 3% milk solids, 0.75% milk fat, 0.09% monoglyceride component, and 0.015% carrageenin. The beverage mixture is then bottled in 8 fluid ounce glass bottles and hermetically sealed. The bottles are retorted at 246° F. for 14 minutes to provide a sterilized, shelf-stable beverage and to decompose substantially all of the potassium bicarbonate to potassium hydroxide and carbon dioxide, resulting in a reduction in pH to 6.4, well within the target range of 6.3 to 6.5. The ready-to-drink iced cappuccino beverage so produced is shelf-stable for nine months at a temperature of 35° to 90° F., and retains excellent organoleptic properties typical of this type of beverage.

EXAMPLE 2

Example 1 is followed except that pectin ("Genupectin LM 12 CG, Hercules) is substituted for the carrageenin component. The resulting ready-to-drink beverage product is shelf-stable for nine months at a temperature of 35° to 90° F., and retains excellent organoleptic properties typical of this type of beverage.

EXAMPLES 3-31

The procedure of Example 1 is followed except that the amount and/or nature of the stabilizer components are varied as reported in the table which follows. The bottled ready-to-drink beverages are left completely undisturbed for two weeks and then inspected for the formation of a milk ring and/or for flavor. Results for the products of Examples 1 and 2 are also reported.

|  |  |  | Buffer | | |
|---|---|---|---|---|---|
| Example | Stabilizer | (%) | Na$_2$HPO$_4$ (%) | KHCO$_3$ (%) | Result |
| 1 | Monoglyceride[1] | 0.09 | 0.04 | 0.08 | No Milk Ring |
|   | Carrageenin[2] | 0.015 |  |  |  |
| 2 | Monoglyceride[1] | 0.09 | 0.04 | 0.08 | No Milk Ring |
|   | Pectin[3] | 0.015 |  |  |  |
| 3 | Carrageenin[2] | 0.015 | 0.03 | 0.09 | Milk Ring |
| 4 | Carrageenin[4] | 0.015 | 0.03 | 0.09 | Milk Ring |
| 5 | Carrageenin[2] | 0.015 | 0.03 | 0.08[5] | Milk Ring |
| 6 | Carrageenin[2] | 0.015 | 0.03 | 0.09 | Less Ring, Off-flavor |
|   | Lecithin | 0.01 |  |  |  |
| 7 | Carrageenin[2] | 0.015 | 0.03 | 0.07 | Milk Ring, Improved |
|   | Monoglyceride[6] | 0.025 |  |  |  |

-continued

| Example | Stabilizer | (%) | Buffer Na₂HPO₄ (%) | KHCO₃ (%) | Result |
|---|---|---|---|---|---|
| 8 | Carrageenin[2] Monoglyceride[6] | 0.015 0.02 | 0.03 | 0.09 | Almost No Milk Ring |
| 9 | Acacia Gum | 0.01 | 0.03 | 0.09 | Milk Ring |
| 10 | Acacia Gum | 0.02 | 0.03 | 0.09 | Milk Ring |
| 11 | Carrageenin[4] Monoglyceride[6] | 0.025 0.02 | 0.03 | 0.09 | Almost No Milk Ring |
| 12 | Carrageenin[4] Caprol 10G-10-O[7] | 0.025 0.01 | 0.03 | 0.07 | Milk Ring, Off-flavor |
| 13 | Carrageenin[4] Caprol 10G-2-O[8] | 0.025 0.01 | 0.03 | 0.09 | Milk Ring, Off-flavor |
| 14 | Carrageenin[4] Caprol 10G-2-O[9] | 0.025 0.01 | 0.03 | 0.07 | Milk Ring, Off-flavor |
| 15 | Carrageenin[4] Tween 80[10] | 0.025 0.01 | 0.03 | 0.07 | Milk Ring |
| 16 | Carrageenin[4] Span 80[11] | 0.025 0.01 | 0.03 | 0.07 | Milk Ring |
| 17 | Carrageenin[4] Tween 80[10] Span 80[11] | 0.025 0.005 0.005 | 0.03 | 0.07 | Milk Ring |
| 18 | Carrageenin[4] Tween 80[10] Span[11] | 0.025 0.015 0.015 | 0.03 | 0.07 | Milk Ring, Off-flavor |
| 19 | Carrageenin[2] Monoglyceride[12] | 0.02 0.05/.07/.08 | 0.03 | 0.07 | No Milk Ring |
| 20 | Carrageenin[2] Caprol 10G-2-O[8] | 0.02 .3 | 0.03 | 0.07 | Milk Ring |
| 21 | Carrageenin[4] Caprol 10G-4-O[9] | 0.02 .3 | 0.03 | 0.07 | Milk Ring |
| 22 | Carrageenin[4] Tween 80[10] Span 80[11] | 0.02 0.015 0.015 | 0.03 | 0.07 | Milk Ring |
| 23 | Carrageenin[2] Monoglyceride[12] | 0.02 0.05 | 0.04 | 0.07 | Slight Milk Ring |
| 24 | Carrageenin[2] Monoglyceride[13] | 0.015 0.05 | 0.03 | 0.08 | Milk Ring |
| 25 | Carrageenin[2] Monoglyceride[14] | 0.015 0.04/.03/.05 | 0.03 | 0.08 | Milk Ring |
| 26 | Carrageenin[2] Santone 10-10-O[15] | 0.015 0.09 | 0.03 | 0.08 | Milk Ring |
| 27 | Carrageenin[2] Monoglyceride[1] | 0.015 0.03 | 0.03 | 0.08 | Milk Ring |
| 28 | Carrageenin[2] Monoglyceride[12] Alanate 100[16] | 0.015 0.025 .25 | 0.03 | 0.08 | Milk Ring |
| 29 | Carrageenin[2] Monoglyceride[12] Alanate 180[16] | 0.015 0.025 .25 | 0.03 | 0.08 | Milk Ring |
| 30 | Carrageenin[2] Sodium Stearyl Lactylate | 0.015 .03/.05 | 0.03 | 0.08 | Milk Ring |
| 31 | Carrageenin[2] Sodium Stearyl Lactylate | 0.015 1.05 | 0.03 | 0.08 | Curdled |

[1] Myverol 18-07K (vegetable oil-derived)
[2] Sea Kem GP-418
[3] Genupectin LM 12CG
[4] Gelcarin GP-379
[5] Potassium Citrate
[6] Myverol 18-00 (animal fat-derived)
[7] Decaglycerol deca-oleate
[8] Decaglycerol di-oleate
[9] Decaglycerol tetra-oleate
[10] Polyethylene oxide sorbitan mono-oleate
[11] Sorbitan mono-oleate
[12] Myverol 18-06 (vegetable oil-derived)
[13] Myvatex 8-06 (contains 20% vegetable oil)
[14] Myvatex 8-16 (contains 20% vegetable oil)
[15] Triglycerol monostearate
[16] Sodium Caseinate

What is claimed is:

1. A method for making a self-stable beverage product comprising the steps of:
   (a) providing a homogenized milk mixture comprising water, milk solids and a two component stabilizer system comprising a first component comprising at least one monoglyceride and up to 10% by weight of diglycerides based on the weight of the first component, and a second component comprising carrageenin or pectin or both;
   (b) providing a buffered aqueous flavoring solution containing an acidic flavoring agent and a buffering system comprising disodium phosphate and potassium bicarbonate in amounts such that the pH of the aqueous flavoring solution is from 6.8 to 7.2;

(c) mixing said homogenized milk mixture and said aqueous flavoring solution to form an intermediate liquid mixture having a pH of from 6.8 to 7.2; and (d) heating said intermediate liquid mixture at a temperature and for a time sufficient to thermally decompose substantially all of said potassium bicarbonate to potassium hydroxide and carbon dioxide such that the pH of the intermediate mixture is from 6.3 to 6.5 and sufficient to form a shelf stable beverage product, said shelf stable beverage product having milk solids, the milk fat content of said milk solids being at least about 15% and the milk protein content of said milk solids being at least about 25% by weight based on the total weight of milk solids, the milk solids content of the beverage product being at least about 1% by weight of the beverage product.

2. The method of claim 1, wherein said intermediate liquid mixture produced in step (c) is hermetically sealed in a container prior to step (d).

3. The method of claim 1, wherein said shelf-stable beverage product is hermetically sealed in a container after step (d).

4. The method of claim 1, wherein said milk mixture is homogenized in at least two stages.

5. The method of claim 1, further comprising adding a sweetener to said intermediate liquid mixture.

6. The method of claim 1, wherein said milk is formed by mixing milk solids with water.

7. A method according to claim 1, wherein said acidic flavoring agent comprises coffee.

8. A method according to claim 1, wherein said acidic flavoring agent comprises tea.

9. A method according to claim 1, wherein said acidic flavoring agent comprises a citrus fruit.

10. A method according to claim 1, wherein said beverage product comprises about 8 to 18% total solids by weight.

11. A method according to claim 1, wherein said beverage product comprises about 25 to 65% total solids by weight.

12. A method according to claim 1, wherein said beverage product further comprises carbon dioxide formed by the thermal decomposition in the beverage product of potassium bicarbonate.

13. A method according to claim 1, wherein said beverage product comprises about 0.05 to 0.25% by weight of said first stabilizer component and about 0.005 to 0.25% by weight of said second stabilizer component.

14. A method according to claim 1, wherein said beverage product comprises about 0.125 to 1.25% by weight of said first stabilizer component and about 0.0125 to 1.25% by weight of said second stabilizer component.

* * * * *